US006848226B1

(12) United States Patent
Boyd et al.

(10) Patent No.: US 6,848,226 B1
(45) Date of Patent: Feb. 1, 2005

(54) ACCESS PANEL

(75) Inventors: Michael David Boyd, St. Kilda (AU); Iain Kilburn White, Macclesfield (AU)

(73) Assignee: Cabspace Holdings Pty Ltd, Victoria (AU)

( * ) Notice: Subject to any disclaimer, the term of this patent is extended or adjusted under 35 U.S.C. 154(b) by 0 days.

(21) Appl. No.: 09/937,902

(22) PCT Filed: Mar. 31, 2000

(86) PCT No.: PCT/AU00/00280

§ 371 (c)(1),
(2), (4) Date: Feb. 27, 2002

(87) PCT Pub. No.: WO00/60191

PCT Pub. Date: Oct. 12, 2000

(30) Foreign Application Priority Data

Mar. 31, 1999 (AU) ............................... PP9550

(51) Int. Cl.[7] ................................. E04C 2/52
(52) U.S. Cl. ..................... 52/220.8; 52/220.1; 52/20; 52/19; 16/225; 220/484; 220/810; 174/48
(58) Field of Search ............. 52/220.8, 220.1, 52/20, 263, 220.3, 220.5, 19; 220/484, 810; 16/725, DIG. 13; 174/48; 124/57

(56) References Cited

U.S. PATENT DOCUMENTS

| | | | |
|---|---|---|---|
| 4,209,660 A | * | 6/1980 | Flachbarth et al. ............ 174/48 |
| 4,222,061 A | * | 9/1980 | Stires, III .................... 346/145 |
| 4,721,476 A | * | 1/1988 | Zeliff et al. .................. 439/142 |
| 4,922,673 A | * | 5/1990 | Ishii et al. ...................... 52/221 |
| 5,010,211 A | * | 4/1991 | Bartee .......................... 174/48 |
| 5,257,487 A | * | 11/1993 | Bantz et al. ................ 52/220.1 |
| 5,571,993 A | * | 11/1996 | Jones et al. .................... 174/57 |
| 5,713,167 A | * | 2/1998 | Durham et al. ........... 52/204.54 |
| 6,179,634 B1 | * | 1/2001 | Hull et al. ................... 439/142 |
| 6,265,662 B1 | * | 7/2001 | Riedy et al. ................ 52/220.8 |

OTHER PUBLICATIONS

UK Patent Publication GB 2 229 222 A Dorman Smith Holdings Limited.*

* cited by examiner

Primary Examiner—Carl D. Friedman
Assistant Examiner—Nahid Amiri
(74) Attorney, Agent, or Firm—James H. Marsh, Jr.; Stinson Morrison Hecker LLP

(57) ABSTRACT

An access panel for providing access to cables, services or the like through an opening in a floor having a floor covering, is disclosed. The access panel includes a floor frame (10) located in the opening and a lid (100) supported on the frame (10). The frame (10) has a support flange (26) extending around its periphery which extends between the floor covering and the floor deck. The flange (26) provides a ramped edge tapered substantially uniformly over a distance of between 10 and 20 times the maximum thickness of the flange (26). The outermost part of the flange (26) is typically formed from a flexible polymeric material. A rib (20) extends around an aperture in the frame (10) and the height of the rib (20) is lower than the load bearing surface of the floor. The hinge (24, 120) is generally square and defines a pivot surface which extends parallel to and is spaced inwardly from an inner edge of the frame (10). A lid (100) for closing the aperture defines a bearing surface (120) which is adapted to slidably engage on the pivot surface (24) to allow the lid (100) to bear and pivot about the pivot surface (24). The lid (100) includes hatches (104, 106) which are moveable between an open position in which there is an aperture in the lid (100) through which cable services may extend and a closed position in which there is no aperture. Locking means (124, 126) are provided between the hatch (104, 106) and the frame (10) to lock the hatch (104, 106) in place in both the open and closed positions.

23 Claims, 9 Drawing Sheets

ACCESS PANEL

FIELD OF THE INVENTION

This invention relates to an access panel for an outlet for cable services through a barrier such as a floor, wall, ceiling, desktop or the like.

BACKGROUND OF THE INVENTION

Modern offices house an extensive array of electronic and electrical equipment which require both power supply and interconnecting communications cabling. As a result, such buildings commonly incorporate a hollow raised floor which provides cavities/ducts along which the cabling travels. The transition of power, phone lines, data cables and the like from the sub floor cavities/ducts is achieved through recessed compartments commonly known as floor boxes. An example can be seen in PCT/GB92/011011 (AU 19759/92). Floor boxes generally incorporate a frame which extends around an aperture in the barrier. For floors the frame is typically clamped between the floor surface and the underside of the floor deck which may be made of particle board, metal, cementitious materials or a combination thereof. The floor box includes a lid for closing the panel and is adapted to support a service outlet box mounted under the lid. The outlet box will provide an array of sockets connected to the various cable networks. Equipment above the floor is connected via cable leads which pass through one or more hatches in the lid, which is, or are, able to be rotated to either an open position or a closed position. However, such existing devices suffer from a number of substantial deficiencies.

First, conventional recessed floor boxes have a substantial edge surround or carpet frame which overlies the floor finish and usually projects above the floor surface. Common surface finishes in office include loose laid carpet or vinyl tiles, carpet or vinyl sheet and melamine laminate sheet. As used herein the term floor surface or floor surface covering means the upper part of the floor covering, for example, the upper surface of a vinyl tile or the top of the pile of a carpet. Thus, the edge surrounds of conventional recessed floor boxes form a ridge in the floor which is both unsightly and a safety hazard and may for example, cause office workers to trip, or upset trolleys.

Conventional carpet frames are generally made from injection moulded plastic and consequently are not particularly strong. The floor boxes do not meet the building standards set for supporting loads which the floor has to meet. Floor boxes are generally exempted from having to meet those standards because they are not, in theory, subject to the same forces as a floor is typically subjected to particularly point or static loads. However, they may be subjected to rolling loads and it would be advantageous to provide an access panel which was substantially as strong as the floor in which it was located.

A further problem with existing floor boxes occurs in the event of a fire. As discussed, the frames are made of a plastics material and support a relatively heavy outlet box. With the heat caused by fire, there is a tendency for the frame to soften and weaken and the outlet box will fall. This creates an aperture in the floor which acts a chimney and facilitates the spread of fire. Thus the performance of conventional recessed floor boxes, under fire conditions is unsatisfactory.

A further problem with conventional floor boxes is that the lid is unsafe because the lids are not locked down and can be accidentally lifted, for example by pulling the cables. This allows the cables to slip away from the latch opening and under the lid itself, where they are subject to shearing between the lid and the edge of the frame if, for instance, a person stepped on the lid. This not only damages the cables but can be dangerous to staff particularly if the cables are electrical supply cables. A further hazard which can occur if the lid is dislodged, is that the box can trip people. Floor boxes are often inactive in which case they often contain coiled cables. Those coiled cables can expand and push against the lid opening the lid. It is thus desirable that the lid should be latchable when it is both opened and closed.

SUMMARY OF THE INVENTION

In a first aspect of the present invention there is provided a floor having a floor covering and an opening in the floor, an access panel for access to cables, services or the like through the opening, the access panel including a floor frame located in the opening, a lid supported on the frame, the frame having a support flange extending around its periphery wherein the support flange extends between the floor covering and the floor.

By placing the support flange of the frame between the floor and the floor covering, the flange is hidden by the floor covering which not only means the appearance of the flange becomes unimportant but also improves safety.

It is preferred that the flange provides a ramped edge thus providing a substantially continuous smooth surface. Unlike conventional floor boxes, the frame does not have to fit over compressed carpet. Thus, it is possible to provide a ramped edge which is relatively thin and flexible, which will fit satisfactorily beneath a floor covering.

Thus in a second aspect of the present invention, there is provided a frame for an access panel comprising a rigid structural element for supporting an outlet box or the like, the frame including a tapered outer edge or flange wherein the flange tapers substantially uniformly over a distance of at least 10, and preferably, 20 times the maximum thickness of the flange.

In a third aspect of the present invention, there is provided a frame for an access panel comprising:
a rigid structural frame, defining an outer edge; and
a tapered flange formed from a soft non structural material, typically a flexible polymeric material, abutting the outer edge.

It is preferred that the flange is pre-cambered and extends below the base of the underside of the outer edge so that the underside of the flange presses against a floor located in the same plane as the underside of the flange. This arrangement ensures that a smooth fit is provided against potentially uneven floors, depending on the degree of unevenness of the floor and also compensate for potential distortions of the outer edge of the flange as a result of the process of its manufacture.

The polymeric material may be attached to and overlying the outer edge, either formed as an overmoulding or formed separately and glued or otherwise fixed to the frame. Alternatively, the polymeric material may not be fixed to the frame but may be separable therefrom. This variant has advantages if the frame is to be recessed into a desk or floor panel.

The structural part of the frame may be formed from a rigid high strength material most preferably an engineering grade plastic such as glass reinforced plastic, or a die cast metal such as zinc or aluminium.

Because the frame edge may fit under the floor covering, the appearance of the frame is unimportant as it is largely hidden. Consequently it is possible to make the frame from metal, if desired although the use of a strong plastics material is not precluded. Using metal however may make the frame and access panel stronger and improves fire resistance.

Various materials may be used to form the overmoulding including EVA, rubber modified polypropylene and polyurethane.

A fourth aspect of the present invention provides a floor having a floor covering, a floor frame for an access panel having a support flange extending around the periphery of the frame and a lid supported on the frame wherein the highest part of the frame and lid do not project above the floor covering surface.

In a preferred embodiment, the frame defines an upstanding rib which extends around a central aperture of the frame which aperture is closable by a lid, the rib being disposed between the peripheral edge of the flange and the central aperture, and wherein the upstanding rib does not project above the load bearing surface of the floor.

The load bearing surface is the surface down to which the pile of the carpet of the floor may crush under normal usage loads. If the floor covering is relatively incompressible for example, vinyl or linoleum, the load bearing surface will be the top surface of the vinyl/linoleum. In use, the floor covering will abut the rib to ensure a close fit of the floor covering around the access panel.

Having all the components of the access panel not projecting above load bearing surface of the floor enables the provision of a smooth floor surface which is both safer and more aesthetically pleasing than is possible with conventional floor boxes.

It is preferred that the materials and construction of the frame and lid of the access panel of the present invention are such that the load bearing capacity of the frame and lid is substantially the same as that of the surrounding floor.

The lid may comprise a rigid strong panel having a flexible overmoulding. The rigid panel may be a steel plate, a die casting or an injection moulded polymer. The flexible overmoulding may be polyurethane or a rubber modified polypropylene.

The frame is typically rectangular, most typically square and may define a pivot surface extending parallel to and spaced inwardly from an inner edge of the frame which abuts the floor deck and defines the aperture. The underside of the lid may define a bearing surface which is adapted to slidably engage on the pivot surface to allow the lid to bear on and pivot about the pivot surface.

In a sixth aspect of the present invention, there is provided a lid for an access panel for insertion into an aperture in a floor, wall or desktop or the like barrier for cable services in communication with an opening through the barrier, and adapted to be seated on a frame disposed around the aperture, the lid including a hatch pivotally connected to the lid, and moveable between an open position in which there is an aperture in the lid through which cable surfaces may extend and a closed position in which there is no aperture, the lid being characterised in that locking means are provided between the hatch and the frame to lock the hatch in place in both the open and closed positions.

In a seventh aspect, the present invention provides a lid for an outlet for cable services through a barrier such as a floor, wall or the like, adapted to be seated on or closely adjacent a surface of the barrier and in communication with an opening therethrough, the lid including a hatch pivotally connected to the lid and moveable between an open position in which there is an aperture in the lid through which cable services may extend and a closed position in which there is no such aperture characterised in that when the lid is latched and the hatch is open, neither the lid or the hatch can be raised from a predetermined position by movement of cable.

In an eighth aspect of the present invention, there is provided a lid for an outlet for cable services through a barrier such as a floor, wall or the like, adapted to, be seated on or closely adjacent a surface of the barrier and in communication with a hole therethrough, the lid comprising a rigid panel formed from a structural material, such as metal or engineering grade polymer and an overmoulding formed from a flexible polymeric material, the overmoulding defining at least one hatch.

The lid and hatch may be joined together by an integral hinge.

The ninth aspect of the present invention provides an access panel for accessing cable services through a barrier such as a floor, wall or the like, the access panel having a frame and a lid and wherein the frame defines first and second bearing surfaces being shaped and configured such that the first bearing surface defines a hinge supported away from a wall of the frame and wherein the lid defines a second bearing or hinge surface whose ends define detents, the first and second bearing surfaces being shaped and configured such that in use the second bearing surface is arranged to bear on the first bearing surface to form an open hinge element, relative movement of the hinge surface about the bearing surface allowing the lid to rotate, characterised in that when the lid is closed, the detents engage underneath the means providing the bearing surface and prevent the one end of the lid adjacent the bearing surfaces from being raised relative to the bearing surface.

In a preferred embodiment, a similar second bearing surface is defined at an opposite end of the frame and a latch on the lid is engageable underneath the second bearing surface. The latch which holds the lid closed, preferably includes one or more projections which engage underneath the second bearing surface, the geometry of the arrangement being such that pressure on the underside of the lid tends to force the latch to close more tightly.

The way the lid is secured by the latch is important as it provides the access panel with a solid feel should it be walked on. Ideally, it should feel as solid as the surrounding floor.

It is preferred that the bearing elements are symmetrically arranged such that the lid can be turned around by 180° with either bearing element acting as the fulcrum for the hinge.

In a particularly preferred embodiment, two further hinge elements are provided so that the lid can be turned around through 90° and still function.

An access panel embodying various aspects of the present invention has substantial benefits in preventing water from entering the access panel when the lid is closed. First, the tapering flange extending around the outside, provides a type of ramp or levee which acts as a first line of defence against ingress of water through the panel.

Secondly, the upstanding rib extending around the frame, in cooperation with the rib around the periphery of lid, also inhibits ingress or water through the lid. The rib is typically rigid but in some embodiments may be formed from a flexible overmoulding in which case it is preferred that the rib is angled towards the centre of the frame. If the edges of the lid are also formed from a flexible material and are also angled, a chamfered sealing fit is formed when the lid is closed on the frame with the rib bent outwardly.

In a particularly preferred embodiment, a third line of defence is a closed channel formed extending along and around one or more inner edges of the frame which is adapted to trap water which has passed between the lid and the upstanding ribs.

Thus in a tenth aspect of the present invention, there is provided an access panel for insertion into an aperture in a floor, wall or the like wherein the frame defines an aperture around which an upstanding rib extends, wherein the edges of the rib are chamfered and wherein the edges of the lid for the access panel are formed from a flexible material and are also chamfered to provide a substantially waterproof sealing fit between the lid and the upstanding rib.

In an eleventh aspect of the present invention, there is provided an access panel for insertion into an aperture in a floor, desktop or the like the access panel including a floor frame defining an aperture and wherein a closed well or trough is defined extending along at least one side of the aperture, preferably on two sides and most preferably on all four sides of the aperture.

One problem with cables, particularly modern data transmission cables, is that they are easily damaged by kinking or bending the cables through too tight a radius.

Thus, in a twelfth aspect of the present invention there is provided an access panel for cables, services or the like comprising:

a frame;

a lid adapted to close the frame;

the lid including a latch pivotally connected to the lid, a hatch movable between an open position in which there is an aperture in the lid for which cable services may extend and a closed position in which there is no aperture, the lid being characterised in that the latch is supported in the open position between two or more pillars which have curved inner faces so as to define an expanding trumpet-shaped aperture for cables extending through the hatch and outside of the panel.

By defining a smoothly curved trumpet shaped opening, a large bend radius of the cables is ensured. Also there are no sharp edges which might kink or damage cables.

It is preferred that the sides of the lid of the lid are tapered inwards to facilitate closure against the carpet frame and also to sweep aside the carpet frame. Typically the edge of the lid has a slope of 30 to 45 degrees.

When the hatch is in the open position it will typically be rotated by 30 degrees relative to the plane of the lid.

One important feature of access panels, is to ensure that they shut securely.

Thus, according to a fourteenth aspect of the present invention, there is provided a lid for an outlet for cable services through a barrier such as a floor, wall or the like, adapted to be seated in a frame located in the outlet, including a latch for locking the lid shut, wherein the latch is bistable in open and closed positions, the latch defining a contact surface which as the lid is closed, contacts the frame to initially pivot the latch in a first direction towards the open position and subsequently after the pivot point of the latch moves below the point of contact of the contact surface with the frame, forces acting on the contact surface due to the frame, tend to cause the latch to pivot in an opposite direction to the closed position.

The contact surface of the latch include a lead-in surface which is angled to rotate the latch open on first contact with the frame and a second upper surface which extends generally parallel to the side of the frame and which rotates the latch towards closure as the lid moves towards the closed position.

The eighth aspect of the present invention, refers to the lid comprising a rigid panel and the hatch being formed in an overmoulding, with the lid and hatch preferably being joined together with an integral hinge. In some embodiments, it is desirable to make both the hatch and lid from a rigid structural material such as engineering grade polymer which precludes the use of a flexible overmoulding. In such an embodiment in order to avoid crushing the pile of the carpet as the hatch is opened, it would ordinarily be necessary for a clearance of around 5 mm to be provided between the hatch and the lid. However, such an arrangement would provide too much play for the hatch and make it liable to accidental closure if it was stood on or kicked.

Thus in a fifteenth aspect of the present invention, there is provided a lid for an outlet for cable services through a barrier such as a floor, wall or the like adapted to be seated on or closely adjacent a surface of the barrier and in communication with a hole therethrough, the lid comprising a rigid panel formed from a structural material, such as metal or engineering grade polymer and a hatch which is attached to the lid wherein the hinge is pivotable about a hinge axis which is located above the plane of the lid.

Typically, the pivot axis will be located at or above the load bearing surface of the lid. The load bearing surface will typically be the crush point of a carpet mounted on the lid. Placing the pivot axis at this height prevents crushing of the carpet when the hatch is open and also avoids the need for a substantial gap between the hatch and lid.

Although, having the pivot at that level is particularly useful when the hatch is not an overmoulding and is formed from a rigid material separately from the lid, the same principle may be applied to the situation where the hatch is an overmoulding and the hinge is a flexible element formed from the overmoulding.

BRIEF DESCRIPTION OF THE DRAWINGS

Specific embodiments of the invention will now be described, by way of example only, and with reference to the accompanying drawings in which:

FIG. 2a is a cross section through one of the components shown in FIG. 2, specifically a latch;

DETAILED DESCRIPTION OF A PREFERRED EMBODIMENT

Figure 1:
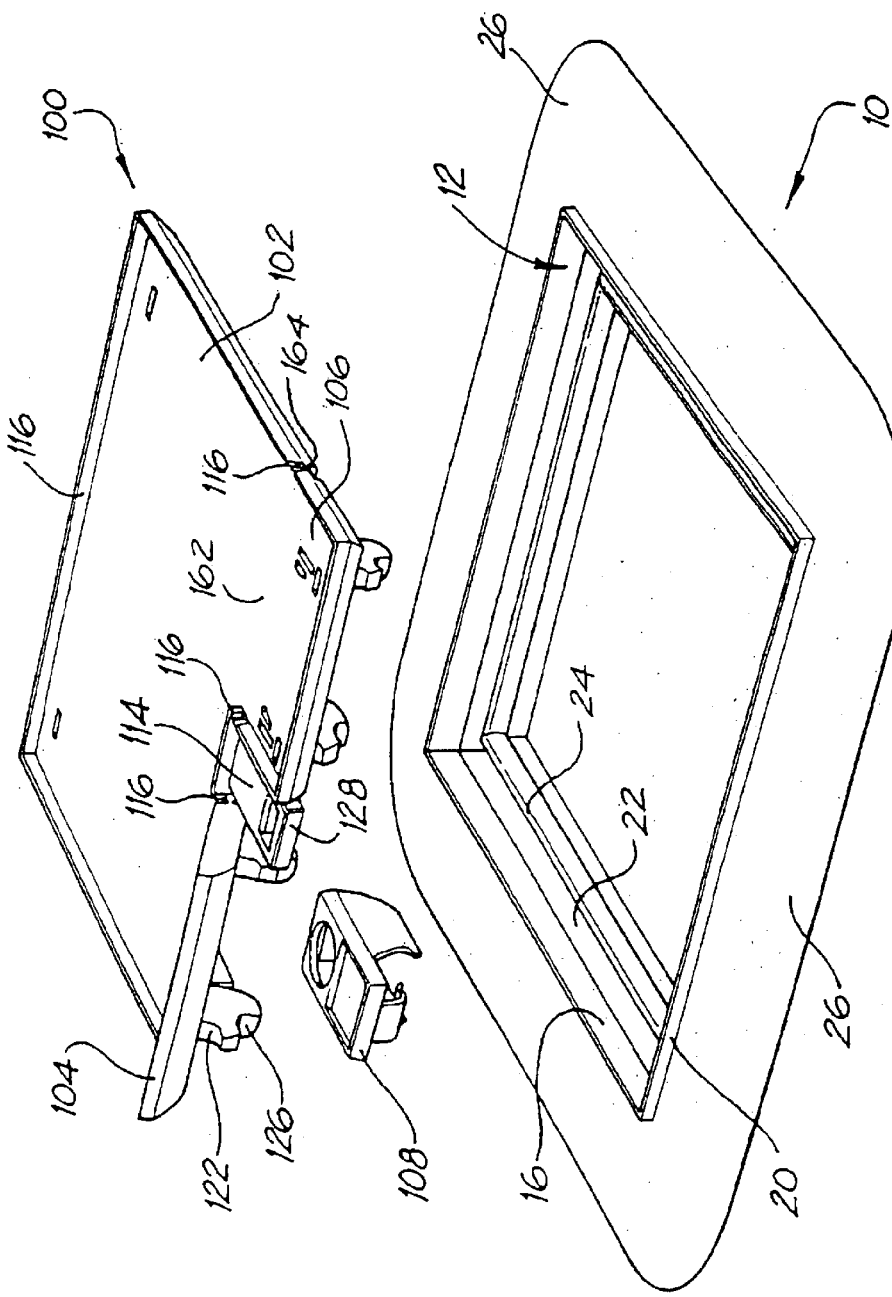
FIG. 1 is a perspective view from above of a first embodiment of an access panel and lid components embodying the present invention for above.
Figure 2:
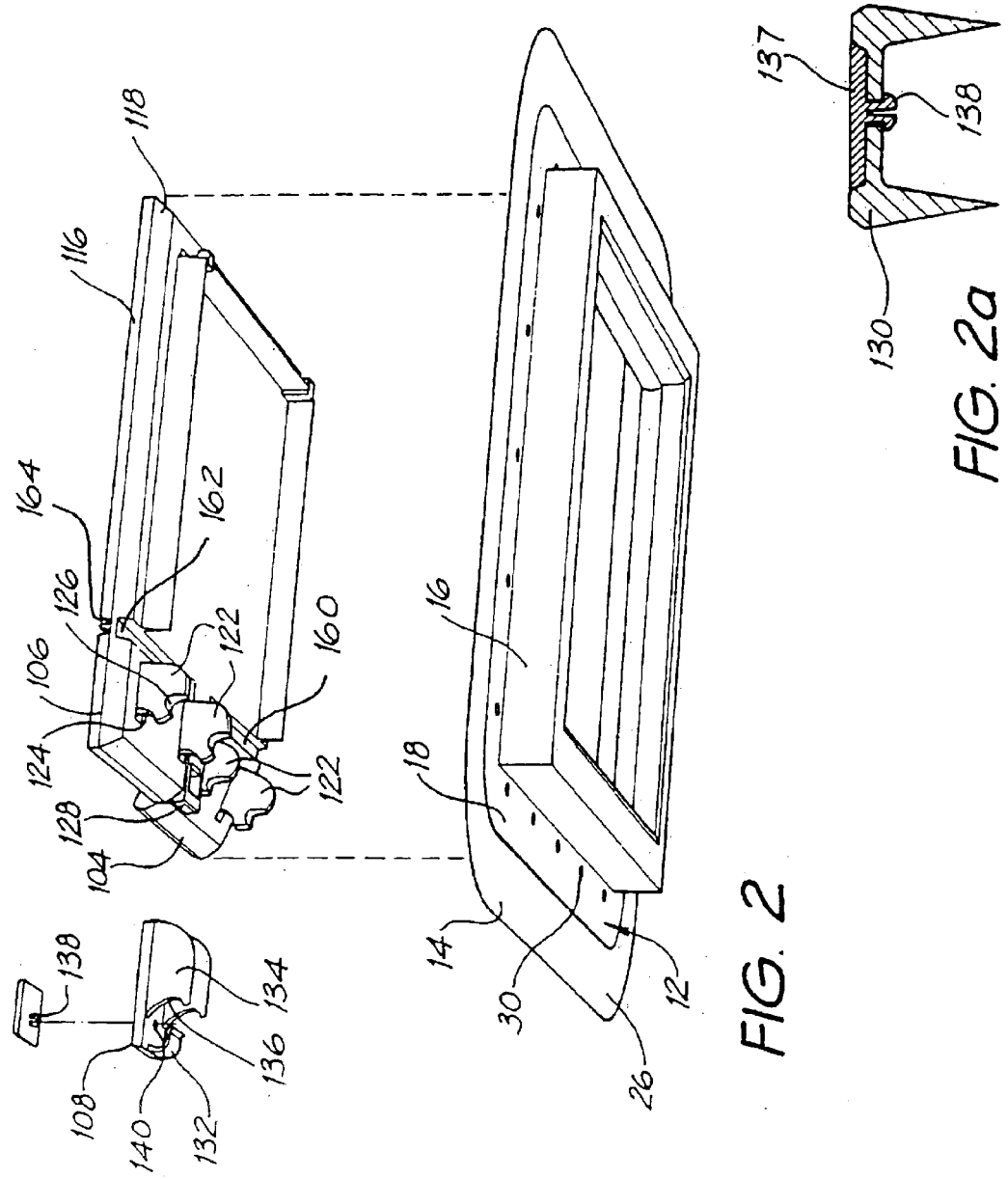
FIG. 2 is a perspective view of the components shown in FIG. 1 viewed from below.
Figure 3:
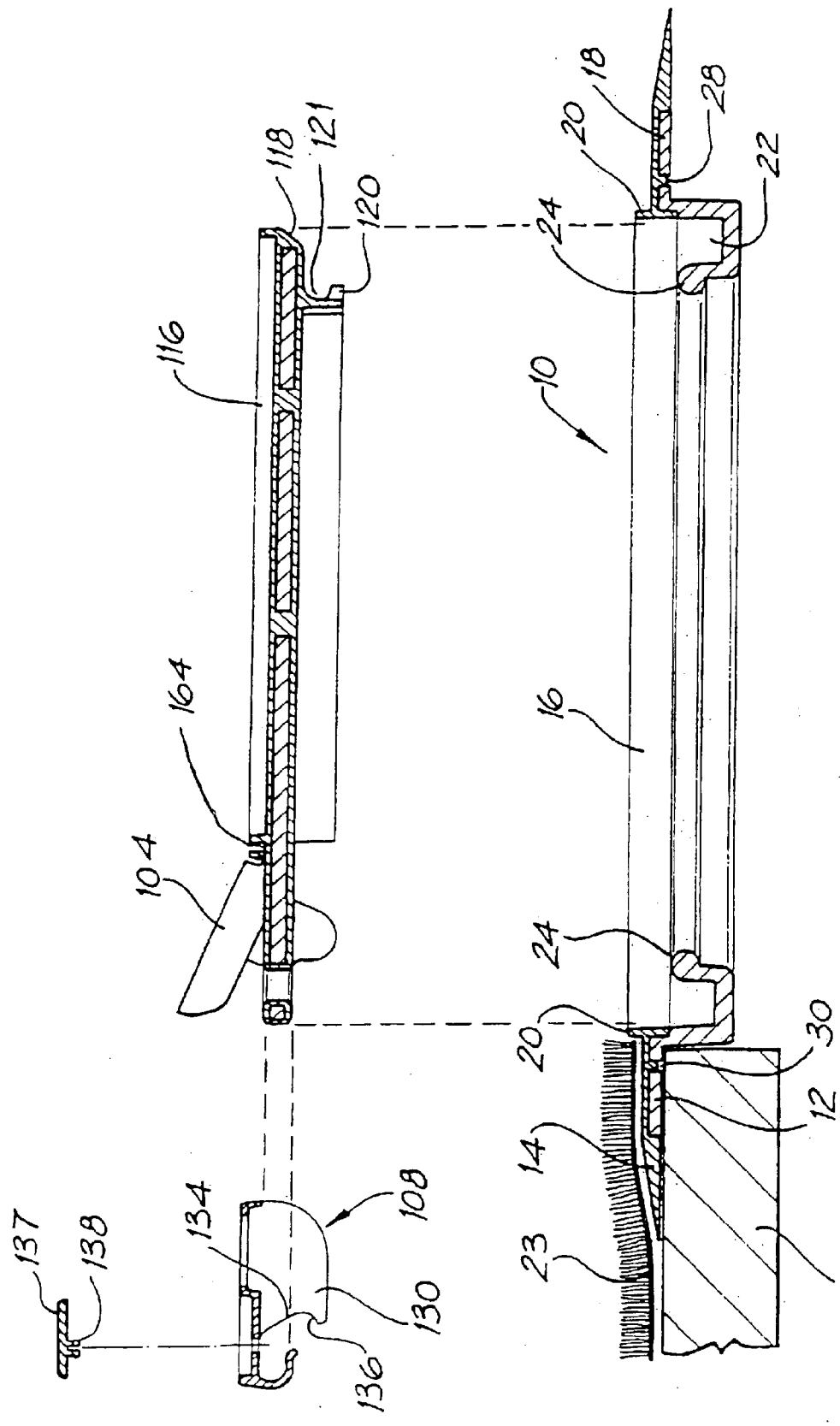
FIG. 3 is a side view of the components shown in FIG. 2.

Referring to FIG. 1, the access panel comprises two sub-assemblies or components, a support frame 10 and a lid 100. Turning to consider the support frame 10 first, as is best seen in FIGS. 2 and 3, the support frame comprises a structural element or frame 12 and a flexible overmoulding 14. The frame is generally square. The structural element is manufactured from a rigid high strength material such as an engineering grade polymer (for example glass filled polypropylene or nylon), or more preferably die cast metal such as aluminium or zinc.

The structural element 12 of the frame includes a square frame element 16 which is adapted to locate inside an aperture in a floor, wall, desk or the like and an integral load bearing flange 18 which extends away from the outer edge of the frame element 16. This flange sits on the floor deck in use and supports the frame element. The load bearing flange 18 may be either screwed or glued to the floor deck. Fastening with screws facilitates removal and reuse of the box but is more time consuming than simply gluing the flange to the floor deck.

Turning back to FIG. 1, channels 22 run along the inner edges of the frame element 16. As is best seen in FIG. 3, the lip 24 of the channel 22 provides a bulbous upper edge which projects inwardly from the channel 22.

The overmoulding 14 is manufactured from a flexible polymeric material such as epdm or polyurethane. The upper edge of the overmoulding 14 defines an upstanding rib 20 which projects above the flange 18. The outer edge of the overmoulding defines a flange 26 which is tapered and forms a ramp which is typically at an angle of from 1 in 10 to 1 in 20. This allows the floor finish such as a carpet, carpet tile or the like, to extend over the flange and abut the upstanding rib 20 extending around the central aperture of the frame. The upstanding rib 20 acts as an edge trim to the floor finish. A typical floor finish is modular carpet tile, and the rib is sized to correspond with the thickness of the bonding layer at the base of the carpet pile. FIG. 3 illustrates the frame 10 located in an aperture in a raised floor deck 21 with carpet 23 extending over the flange 26 and abutting the upstanding rib 20.

The overmoulding may be moulded separately to the structural frame and then attached. Alternatively, it may be moulded directly onto the frame. To ensure that the overmoulding is firmly attached to the structural frame, buttons 28 are provided on the underside of the overmoulding which engage in corresponding sockets 30 defined in the structural frame.

Figure 4:
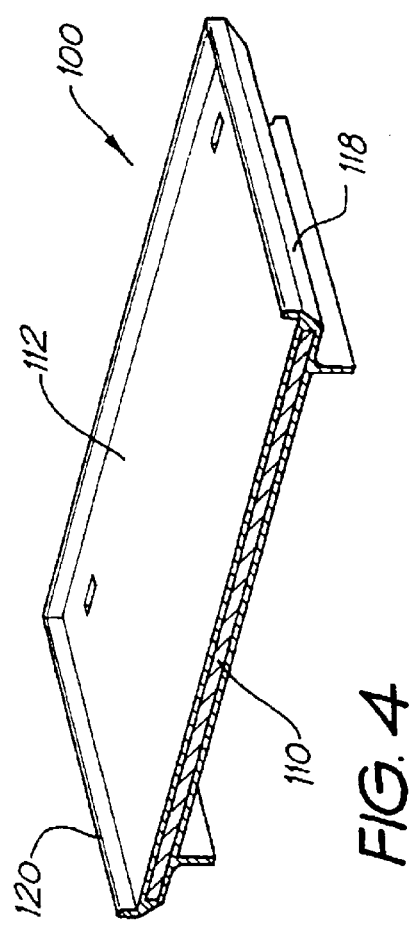
FIG. 4 illustrates a section through a lid for the access panel shown in FIG. 1.
Figure 5:
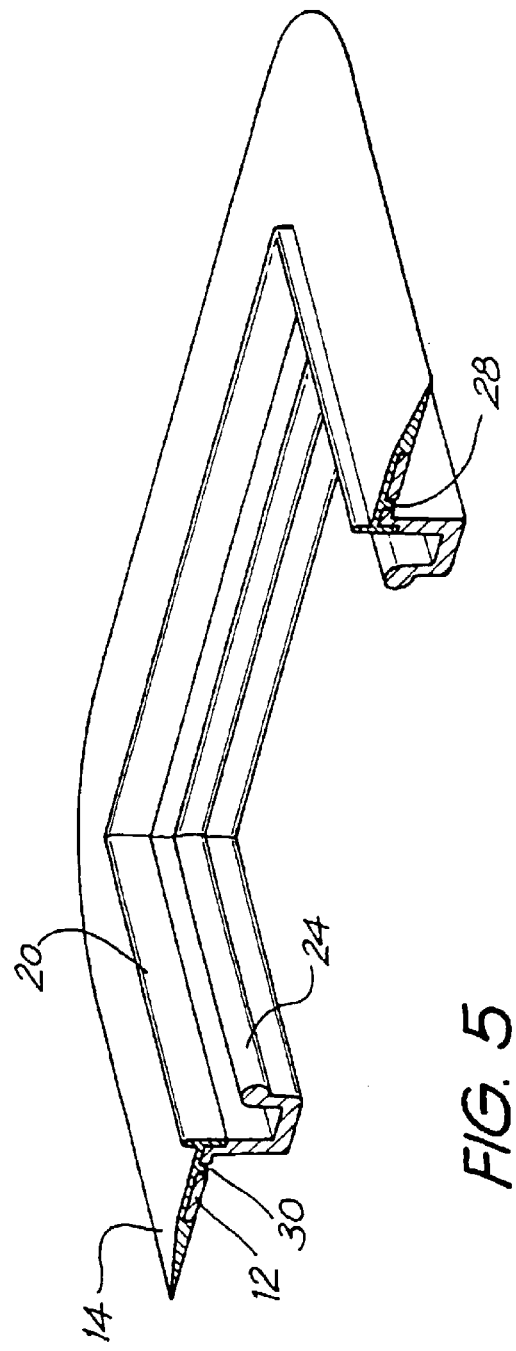
FIG. 5 shows a section through a frame for the access panel shown in FIG. 1.
Figure 6:
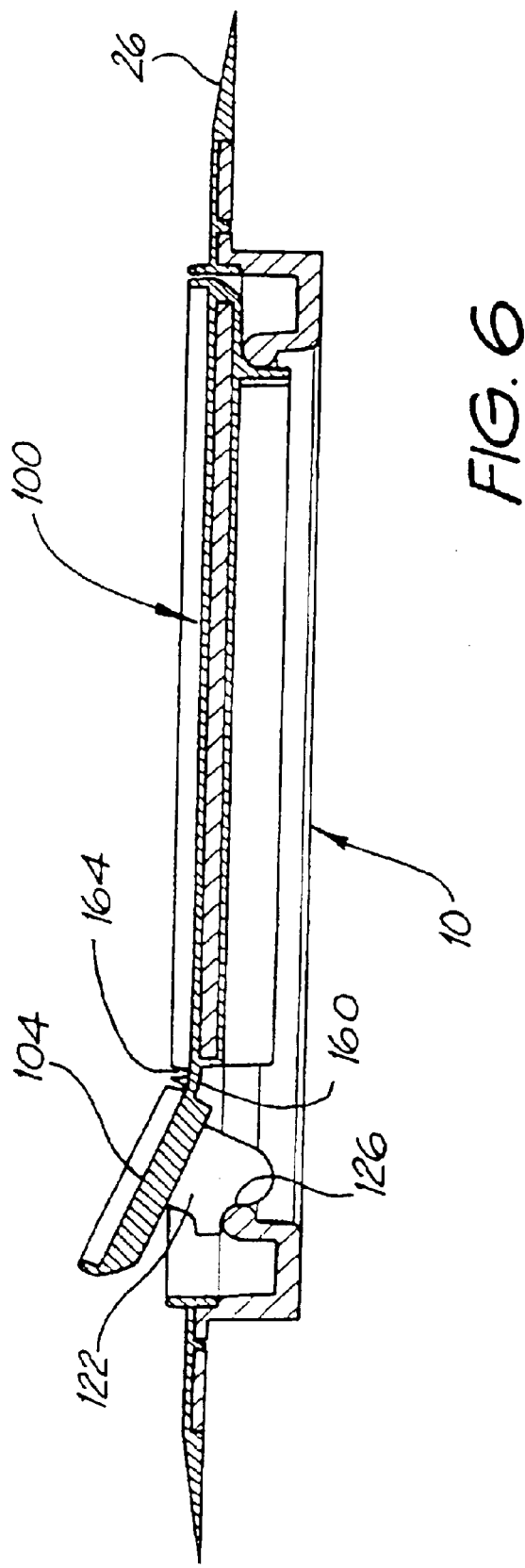
FIG. 6 illustrates the lid located in position on the frame with a hatch in an open position.

The lid 100 has three elements; the lid panel itself 102, access hatches 104 and 106, and a latch 108. With reference to FIG. 4 in particular, the lid has a structural core 110 and a flexible overmoulding 112. The core comprises a rigid plate manufactured from metal or engineering grade polymer although the preferred material is steel plate because its strength allows for the core to be relatively shallow, thus providing maximum clearance for plugs and cable terminals inside the box cavity, yet providing a strength which is comparable to the surrounding floor. However, engineering grade polymers have the advantage of being mouldable to more exacting tolerances than steel and would simplify overmoulding of the outer sheath 112 of the lid 100.

With reference to FIG. 1, the main central area of the lid is formed from the steel plate as is an integral tongue 114 whilst the hatches 104 and 106 are formed from the flexible overmoulded material. The tongue may, however, be formed, wholly or partly, from the flexible overmoulded material. This allows the hatches 104, 106 to be linked with the lid panel 102 by flexible hinges 160, 162 formed from the flexible material.

Around the outer edge of the lid and hatches, there is an upstanding ridge 116 which defines a rectangular perimeter which has a small cut-out where the tongue is formed and which is adapted to receive a piece of carpet tile or the like for matching the appearance of the lid to the surrounding floor covering. As is best seen in FIG. 4, below the ridge, the outer edge 118 of the lid is chamfered which assists in forming a good seal with the upstanding rib 20 of the overmoulding when the lid is used to close the aperture in the frame of the access panel 10.

The angle of the chamfered edge is about 30 to 40°. The chamfer also has the function of sweeping aside carpet pile so that the carpet pile is not trapped beneath the edge of the lid when the lid is closed.

As is best seen in FIG. 3, the underside of the lid defines one or more ledges 120 extending away from the opposite side of the lid to the hatches. The upper part of the ledge and the lower part of the lid define a curved generally J shaped bearing surface bearing or socket 121. In use, when the lid is placed on the frame, the socket engages over the lip 24 of the channel and this forms an open hinge which allows the lid to rotate about the lip 24 which acts as a fulcrum to either open or close the access panel. Further, as the ledge 120 engages under the bulbous lip 24, pressure on the underside of the lid does not cause the ledge 120 to be raised relative to the lip, as the lip acts as a barrier.

The hatches are part of the overmoulding and are thus formed from a flexible material and consequently have to have thick cross sections to provide sufficient stiffness. The thick cross sections also allow large bend radii which inhibits kinking of the cables.

As discussed above, the hatches 104, 106 are joined to the lid body by relatively thin webs which act as integral hinges 160, 162. In the areas where there is an upstanding ridge 116, V shaped cut-out portions 164 are provided in the ridge to allow the hatches 104, 106 to rotate relative to the lid body 102. The hinge webs are relatively long to ensure that the hatch will bend when the lid is covered with a floor surface material, not shown, which is glued onto the lid inside the perimeter defined by the ridge 116.

Turning to FIG. 2, each hatch has two supporting pillars 122 depending from the underside of the hatch, which support the hatch in an open position when required. As can be seen, each pillar has two concave support recesses, an upper recess 124 adjacent the base of the hatch surface and a lower recess 126 close to the lower end of the depending pillar. The upper set of recesses are adapted to hold the hatches in a closed position. The lower set of recesses hold the hatches in an open position. If it is desired to provide more than one opening aperture, for example to allow for a larger than normal cable, another set of recesses may be provided on the pillar for each desired angle of opening. In another embodiment of the invention the upper recess may be omitted in which case the hatch is retained closed by a face of the pillar 122 abutting against the lip 24 of the frame.

Each pillar has an outwardly curving inner face such that the gap between the two pillars supporting a hatch increases from the hinge joining the hatch to the lid outwardly to define a trumpet shaped opening which prevents kinking and over-tight bends in the cables when fed through the hatch.

A tongue 114 extends away from structural core 110 of the lid and is integral therewith. On the free end of the tongue a cylindrical hinge shaft 128 is defined. The latch 108 is mounted on that shaft. The latch comprises a lever which was a generally C-shaped hinge barrel 132 on one end and two downwardly projecting flanges 134 each having a concave mouth 136 which is adapted to engage on the bulbous lip 24 of the channel when the latch is closed. The hinge barrel 132 is retained on the hinge shaft 128 by a snap in retaining clip 137 which has a depending button 138 on its underside which projects through a hole 140 in the latch and the button engages against the hinge shaft 128 preventing the latch from dislodging from the shaft. The geometry of the arrangement is such that when the lid is closed with the latch locked, upward forces on the lid tend to force the latch into a tighter closure.

In an alternative construction, not shown, the latch may be formed integrally with the trap door over moulding as a projection off the end of the tongue. In either configuration the latch may have a single central projecting flange that passes through a slot in the tongue. Again the flange has a concave mouth which engages around the channel bulb 24. The latch has projections that prevent the latch from rotating out of the slot in the tongue. These can be formed as elements on the flange, or as a secondary flange on each side of the latch lever or as a projection off a retaining clip. In this configuration the retaining clip is similar to the clip 136 described above but serves to stiffen the lever to offset the flexibility of the moulding material.

The retaining clip may be embossed or otherwise treated to display a brand name or label such as "pull to open". Alternatively it may be transparent and have mounted beneath it an LED or warning light indicative of the power status of the wiring leading to the floor box. In many applications it is desirable to have a floor box dedicated to one particular cable service, for example for power. In this configuration rather than a square access panel, the access panel will be relatively long and narrow and the lid will typically have only one hatch which is located on one side of the lid.

In another alternative embodiment the service sockets are not mounted in the box but may be mounted on the underside of the lid so that when the lid is opened the sockets are rotated above the floor where they are more easily accessible. In this embodiment the lid will be fitted with a flexible conduit to protect the incoming cables.

Figure 7:
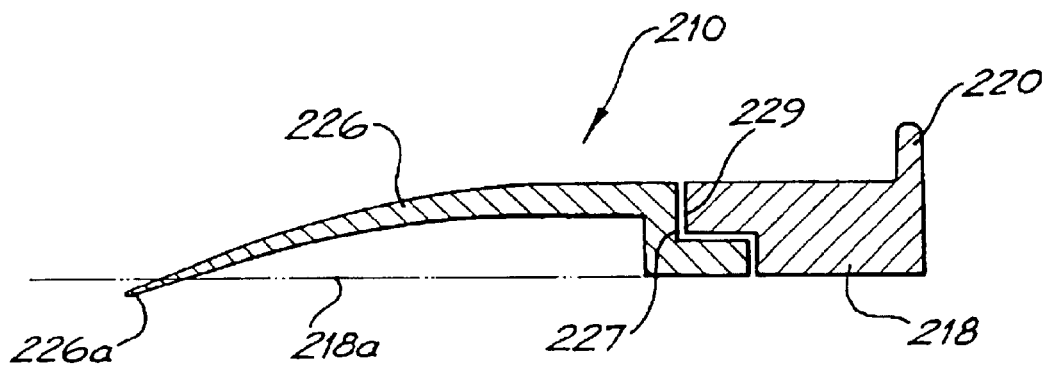
FIG. 7 illustrates a variant of the frame of the first embodiment having a modified flange arrangement.

FIG. 7 shows a variant of the support frame shown in FIG. 1. In the variant 210, of which only the outer part forming the flange and upstanding rib 220 is illustrated, the flange 226 is not formed as an overmoulding, but instead is formed separately but is still typically formed from a flexible polymeric material. The inner edge of the flange defines an L-shaped rebate 227 which mates with an inverted L-shaped rebate 229 on the outer edge of load bearing flange 218. The underside of the flange 226 is cambered so that the tip 226a of the flange projects below the plane of the lower surface 218a of the load bearing flange 218 so that the flange is biased to press downwardly to form a smooth fit against uneven floors.

If desired, the flange 226 may be glued to the load bearing flange 218. In the variant shown in FIG. 7, the upstanding rib 220 is formed from the material of the frame in a structural material such as engineering grade polymer and is not made from the same flexible polymeric material as the flange 226.

Figure 8:
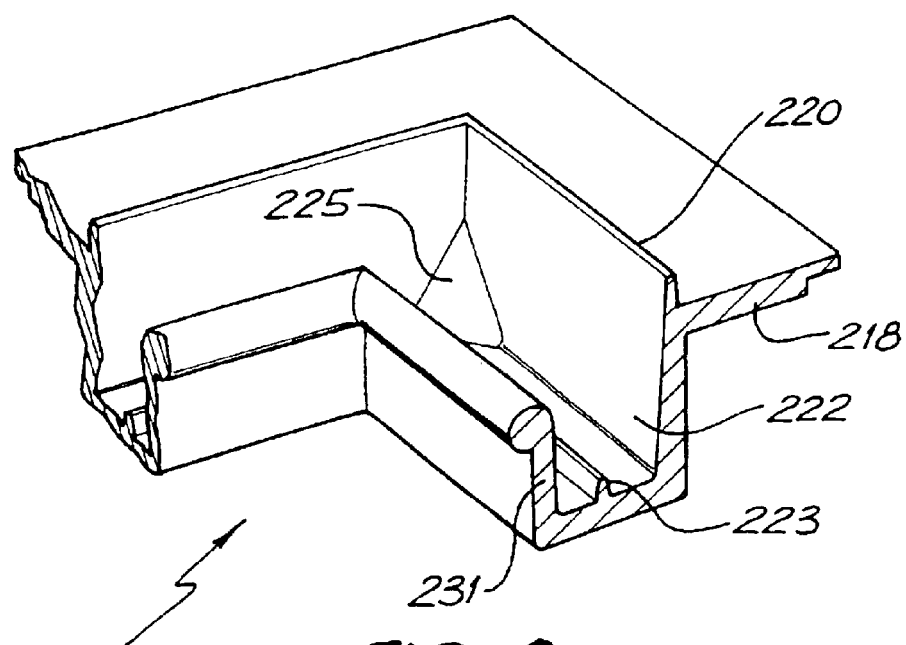
FIG. 8 is a perspective view of part of the frame of the variant shown in FIG. 7 illustrating further modified features.

FIG. 8 shows a perspective view of one corner of the support frame 210. Variations not shown in the first embodiment, include an upstanding rib 223 which extends along the base of the channel 222 of the frame 210 and generally triangular infills 225 located in the four bottom corners of the frame where the channels meet.

When the lid 100 is in the open position in which one of the edges of the lid 100 is located inside channel 222, the rib 223 and/or the triangular infills 225 press against the ridge 116 and act to hold the underside of the lid against the inner surface 231 of the channel. This keeps the top surface of the lid, which is usually carpeted, away from the sides of the channel and the upstanding rib 220, and helps prevent the carpet from being crushed.

Figure 9:
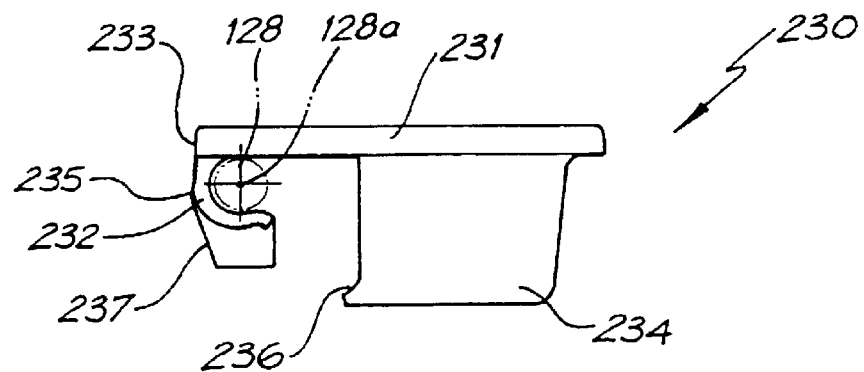
FIG. 9 is a schematic side view of a variant of a latch for the access panel of the present invention.
Figure 10:
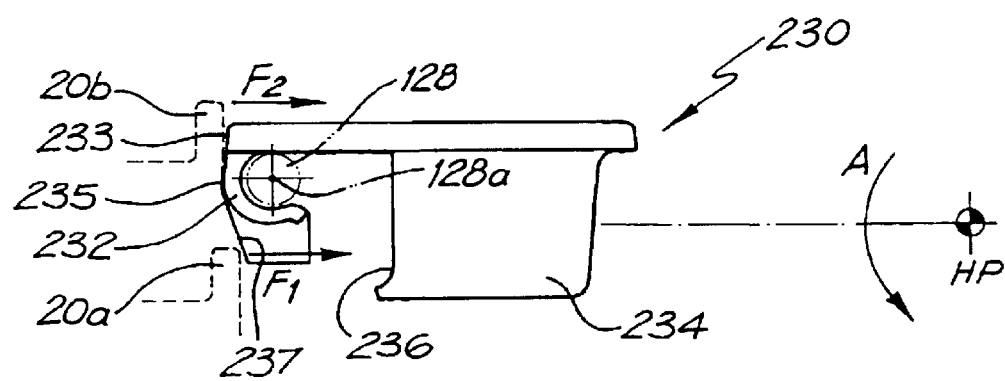
FIG. 10 is an explanatory diagram illustrating the forces biasing the latch in open and closed positions.

FIG. 9 shows a variant 230 of the latch. Like latch 130, latch 230 comprises a lever 231 from which depends a generally C-shaped hinge barrel 232 on one end and two downwardly projecting flanges 234 (of which only one is visible), each having a generally concave mouth 236 which is adapted to engage on the bulbous lip 24 of the channel when the latch is closed. The hinge barrel 232 is retained on the hinge shaft 128 by a snap-in retaining clip, not shown, which has a depending button on its underside which projects through a hole in the latch and the button engages against the hinge shaft 128 preventing the latch from dislodging from the hinge shaft in an arrangement which is not illustrated in FIG. 9 but is as described in relation to the first embodiment of the latch.

The latch is bi-stable, i.e. stable in two positions, an open position and a closed position.

The first stable position is when the latch is in the closed position and the latch lever 231 is generally parallel to the lid.

The second stable position occurs when the latch is open and the lever extends upwardly at an angle of about 60° to the plane of the lid.

As the lid is closed, the structure of the latch and its interaction with the upstanding rib 20 of the frame are such that the latch is first of all moved to the open stable position if it is not already in the open position and as the lid is pressed down the latch is maintained in the open position until the central axis 128a of the hinge shaft 128 passes the rib after which time the interaction between the rib and the latch is such as to cause the latch to lock closed. This is explained with reference to FIG. 9, in which the interaction between the latch and the upstanding rib 20, shown in two positions a and b in dashed lines, is illustrated. First, as is best seen in FIG. 9, it should be noted that the outer edge of the latch, being the edge which interacts with the rib 20 as it passes the rib, includes a first, upper portion 233, which is generally planar and extends generally perpendicular to the plane of the lever 231, a slight bulge 235 and a sloping "lead-in" portion 237 which is angled at approximately 5 to 10° relative to upper portion 233. As the lid is closed, the lid and latch pivot about a point distal from the latch as the distal edge of the lid pivots on one of the bulbous lips 24 of the channel, HP. The lid and latch move downwards until the lead in surface 237 contacts the rib 20a. The rib exerts a reaction force $F_1$, on the lead in surface 237 which applies a torque to the latch which acts about the pivot axis 128a of the latch and causes the latch to rotate about the hinge barrel 128 in the same direction as the force $F_1$, thus moving the latch to the open stable position. If the latch is already in the open position, the force $F_1$ helps bias the latch in that position. However, as the lid rotates further down in the direction A, the point of contact between the upstanding rib 20 and the outer edge of the latch crosses the bulge 235 which is coincident with the axis 128a of the hinge barrel 128 after which time the force $F_2$ acting on the latch due to the interaction of the upper portion 237 with the rib 20 acts above the central axis of the hinge shaft 128. The reaction force $F_2$ causes the latch to rotate in the opposite direction of the hinge shaft, thereby closing the latch automatically as the lid is closed.

Thus, the latch is automatically opened and then closed to lock the lid in place as the lid is lowered closed. The biasing of the latch in either the fully closed or fully open position has safety advantages as it means that the latch is either in the closed position in which case the lid is securely latched or, if open, is very obviously open.

Finally, FIGS. 11 to 15 illustrate a yet further variant of the present invention, in which the hatch and lid are moulded separately, typically in an engineering grade polymer which is rigid. The hatches and the lid are then assembled together in a manner in which the hatch is pivotable relative to the lid for opening and closing the hatch. If the latch and the lid are both made from a rigid material, and the latch is conventionally hinged to the lid in the plane of the lid, the inventors discovered that problems arose. These problems arise because of the conflicting need to minimise the gap between the lid and the hatch for aesthetic and safety reasons and the need to provide a clearance, in the order of 5 mm, to allow the hatch to rotate to the open position.

Figure 11:
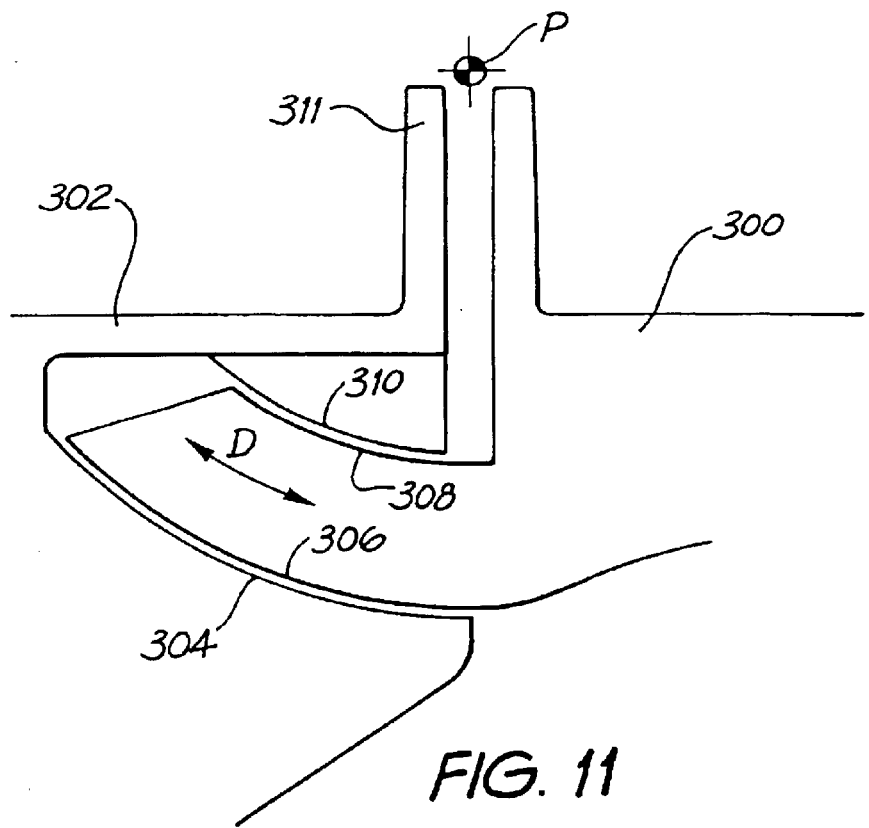
FIG. 11 is a schematic side view of an alternative hinging mechanism for a variant of the hatch.

The embodiment described in FIG. 11 et seq, solves this problem by having the pivot point of the latch above the pile of the carpet or at least above the load bearing surface corresponding to the crush point of the carpet, thus avoiding the requirement for the 5 mm gap and reducing the amount of required clearance. The lack of clearance means that the hatch can be pivoted open, the lid closed and latched shut with the hatch locked open, with the hatch remaining resistant to accidental closure such as when it is stood on, kicked or the like.

As discussed above, the lid 300 and hatch 302 are separately formed from engineering grade polymer. The schematic drawing in FIG. 11, shows a series of pairs of bearing surfaces 304, 306 and 308, 310 respectively which are arcuate and which are all centred on the pivot point P about which the hatch 302 rotates. The pivot point P is typically at the crush point of the carpet just above the upstanding wall/rib 311. It is to be noted that pairs of bearing surfaces which are shown in FIG. 11 do not all occur in the plane as is suggested in FIG. 11 (which merely illustrates the principal of operation of the hinge), but in fact occur in different planes as illustrated in the subsequent drawings.

Figure 12:
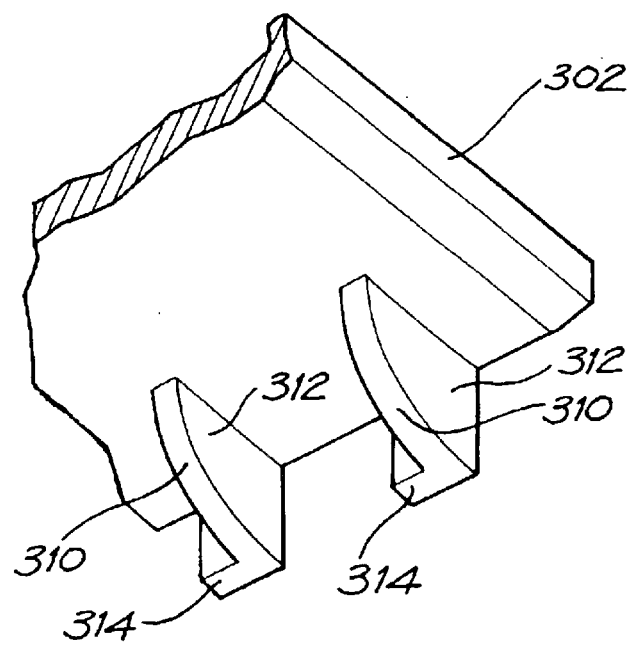
FIG. 12 is a pictorial sketch of part of the underside of the variant of the hatch illustrated in FIG. 11.

FIG. 12 shows a perspective view of a part of the underside of a hatch 302 from which can be seen a series of depending ribs 312 which define the arcuate sliding surface 310 which cooperates and slides on sliding surface 308 which is part of the lid 302 as described below.

As can be seen from FIG. 12, at the rear end of the rib below the upstanding wall 311, at the rear end of one or more of the ribs, there is a projection 314 which projects to one side of the rib 312. Thus, the rib is generally L-shaped in horizontal cross section.

Figure 13:
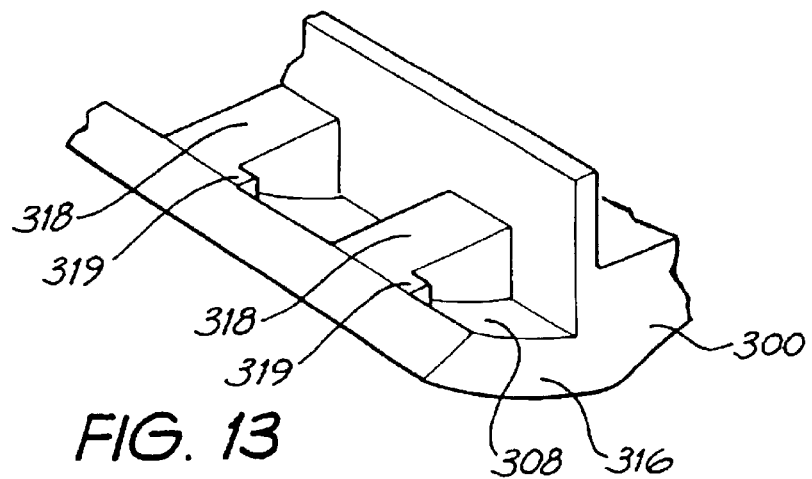
FIG. 13 is pictorial sketch of a part of the lid adapted to cooperate with the underside of the hatch shown in FIG. 12.
Figure 14:
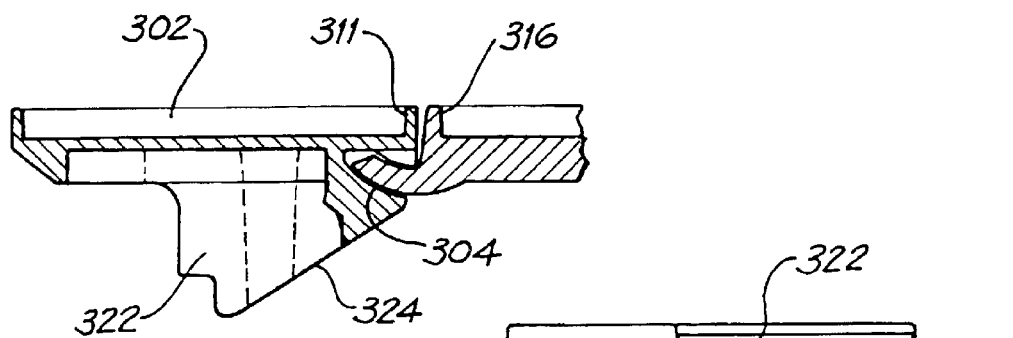
FIG. 14 is a schematic side view of a pillar of the hatch of FIG. 11.
Figure 15:
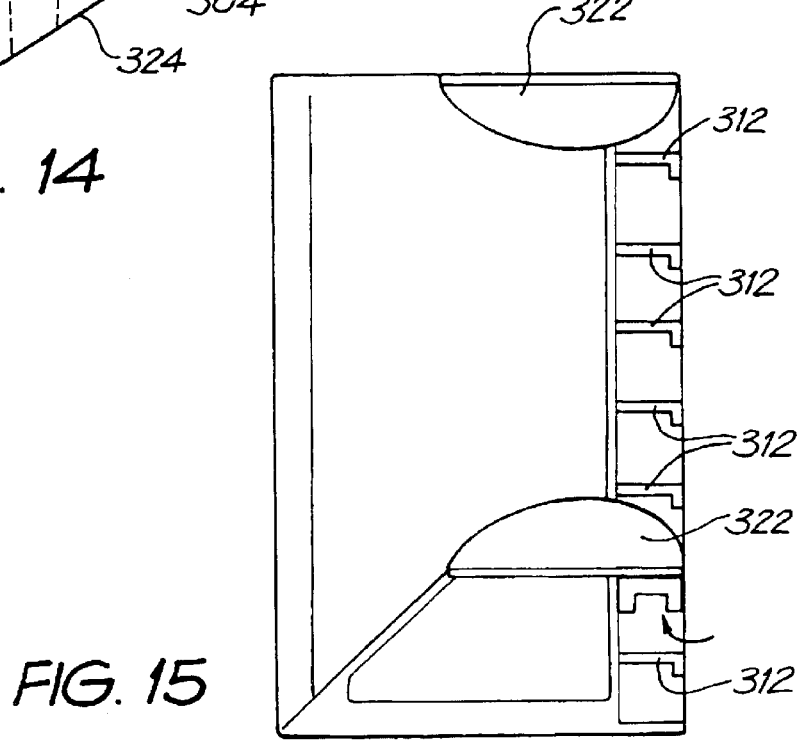
FIG. 15 is a view of the underside of the hatch of FIG. 14.

FIG. 13 is a perspective view showing a projection 316 from the lid 300 which defines an arcuate hinge support and bearing surface 308 on which the hatch slides. Extending upwardly from the bearing surface 308, are a series of pillars 318 which define stop portions 319 on one side of the pillar so that the pillars are generally L-shaped in cross section in the plane of the lid. The upper surface of the pillars are parallel to the plane of the lid and to the plane of the hatch when the hatch is in the closed position, in which position, the bottom surface of the top of the hatch rests on top of the pillars. FIG. 14 illustrates support pillars 322 of the hatch which are similar to support pillars 122 of the first embodiment of the hatch except that the inner surface 324 of the support pillar is generally planar and sloping, and at the top of the pillar an arcuate slot 326 defines bearing surface 304. The hatch may be located on the lid by simply sliding the arcuate projection 316 between the lower end, of the ribs and the arcuate surface 304 defined by the support pillars 322 located at each end of the hatch (clearly these two surfaces are spaced apart from one another and the arcuate portion does not actually slide between them as such). Once the hatch has been slid onto the arcuate portion, it can be displaced laterally until the projections 314 abut the side of the pillars 318 and the hatch is locked on the lid and locked in place. When the latch is fitted this prevents the hatch from sliding back to the position of initial fitment and it is therefor unable to be accidentally removed. When the hatch is opened, projections abut the stop portion and prevent the hatch from being removed from the lid and also limit the angle about which the hatch may rotate. The particular hinge structure also constrains the arc of movement of the hatch and this reduction in "play" also helps to prevent accidental closure of the hatch.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. Structure providing access to an area beneath a floor, said structure comprising:
   a segment of a floor having an upper surface and an opening therethrough;
   a floor covering on said upper surface of said floor segment;
   an access panel providing access to said area through said opening, said access panel including a floor frame located in the opening and a lid supported on the frame, said frame including a support flange extending therearound, said support flange being disposed so as to extend outwardly from the frame between the floor covering and the upper surface of the floor segment.

2. Structure as set forth in claim 1, wherein the flange includes a ramped edge.

3. Structure set forth in claim 1, wherein the flange comprises two abutting parts formed from respective different materials.

4. Structure providing access through an opening in a floor segment comprising an access panel including a rigid structural frame and a lid for closing an aperture in said frame, said frame including a tapered, outwardly extending, floor covering underlying flange having a thickness which tapers substantially uniformly over a distance of at least 10 times the maximum thickness of the flange and a floor covering overlying said flange.

5. Structure providing access to an area beneath a floor as set forth in claim 1, wherein said frame is rigid and has an outer edge, and said flange is tapered, formed from a soft non-structural material and disposed in outwardly extending relationship relative to said outer edge.

6. Structure as set forth in claim 5, wherein the flange is formed from a flexible polymeric material and attached to an upper portion of the outer edge.

7. Structure as set forth in claim 5, wherein the flange is separate from the outer edge and includes a step portion arranged to mate with a complementary mating portion located at an upper portion of said outer edge.

8. Structure as set forth in claim 1, wherein said frame includes a central, lid closable aperture and an upstanding rib which extends around said aperture, said rib being disposed between a peripheral edge of the flange and the aperture and being arranged and located such that the same does not project above a level down to which a floor covering on the floor around the frame would crush under normal usage loads.

9. Structure as set forth in claim 4, wherein said access panel is supported by the floor segment, the materials and construction of said frame and said lid being such that the load bearing capacities thereof are not substantially less than that of the floor segment.

10. Structure as set forth in claim 8, wherein the lid comprises a rigid structural panel having a flexible over-moulding.

11. An access panel for providing access through an opening in a floor segment, said panel including a rigid structural frame and a lid for closing an aperture in said frame, said frame including a tapered, outwardly extending, floor covering underlying flange having a thickness which tapers substantially uniformly over a distance of at least 10 times the maximum thickness of the flange, wherein the frame is rectangular and includes a pivot surface for the lid that extends parallel to and is spaced inwardly from an inner edge of the frame, said frame abutting the floor segment and having a portion thereof positioned in said opening.

12. An access panel as set forth in claim 11, wherein the lid has a bearing surface on an underside thereof, said bearing surface being in slideable engagement with the pivot surface so as to allow the lid to bear on and pivot about the pivot surface.

13. A lid for use with an outlet facilitating access for a cable through a barrier, said outlet being adapted to be seated adjacent a surface of the barrier and in communication with an opening therethrough, said lid including a latch releasably securing the lid in a closed condition relative to the outlet and a hatch that is pivotally connected to a panel of the lid for movement between an open position providing an aperture in the lid through which cable services may extend and a closed position where no such aperture is provided, the arrangement of said latch, hatch and lid panel being such that when the lid is latched and the hatch is open, neither the lid nor the hatch can be raised from a predetermined position by movement of said cable, said hatch including supporting structure configured and arranged to selectively retain said hatch in either its open position or its closed position.

14. A lid for use with an outlet facilitating access for cable services through a barrier, said outlet being adapted to be seated adjacent a surface of the barrier and in communication with a hole therethrough, said lid comprising a panel formed from a rigid structural material and an overmoulding formed from a flexible polymeric material, said overmoulding defining at least one openable hatch and forming an integral hinge joining the lid and the hatch together.

15. An access panel comprising a frame for insertion into an opening in a barrier, said frame defining an aperture and including an upstanding rib which extends around the aperture, said rib having a chamfered edge, said access panel including a lid for the aperture having a chamfered edge formed from a flexible material, the arrangement of said chamfered edges being such that a substantially waterproof sealing fit is provided between the lid and the upstanding rib.

16. An access panel for providing access through a barrier, said panel comprising:
 a frame;
 a lid configured and arranged for closing the frame, said lid including a hatch that is pivotally connected thereto for movement between an open position providing an aperture in the lid and a closed position where no aperture is provided; and
 two or more latch supporting pillars having curved inner faces configured and arranged to support the hatch in its open position and thereby define an expanding trumpet-shaped aperture.

17. An access panel as set forth in claim 16, wherein the sides of the lid are tapered inwardly to facilitate closure of the frame by the lid and sweeping aside of any carpet positioned adjacent the frame to avoid trapping of carpet when the frame is closed by the lid.

18. An access panel as set forth in claim 17, wherein the tapered sides of the lid are sloped at an angle of 30 to 45 degrees.

19. Structure as set forth in claim 5, 6 or 7, wherein the frame includes a central, lid closable aperture and an upstanding rib which extends around said central aperture, said rib being disposed between a peripheral edge of the flange and the central aperture and being arranged and located such that the same does not project above a level down to which the pile of a carpet on the floor around the frame would crush under normal usage loads.

20. A floor structure including a floor segment, structure as set forth in claim 5, 6 or 7 wherein the frame is supported by the floor segment, and a lid for closing an aperture in said frame, wherein the materials and construction of the frame and lid are such that the load bearing capacities thereof are not substantially less than that of the floor segment.

21. A floor structure including a floor segment and structure as set forth in claim 5, 6 or 7, wherein said frame is supported by the floor segment, is rectangular and is arranged and configured to define a pivot surface that extends parallel to and is spaced inwardly from an inner edge of the frame, which inner edge abuts the floor segment and defines an aperture therein.

22. A lid as set forth in claim 13 or 14, wherein the barrier is a floor, a wall or a desktop.

23. An access panel as set forth in claim 15 or 16, wherein the barrier is a floor, a wall or a desktop.

* * * * *